US011035827B2

(12) United States Patent
Friend

(10) Patent No.: US 11,035,827 B2
(45) Date of Patent: Jun. 15, 2021

(54) METHODS AND INSTRUMENTATION FOR DETECTION OF TRANSVERSE ROLLING CONTACT FATIGUE RAIL DEFECTS WITHIN HEAD-HARDENED RAIL

(71) Applicant: Rodney Friend, Sydney (AU)

(72) Inventor: Rodney Friend, Sydney (AU)

( * ) Notice: Subject to any disclaimer, the term of this patent is extended or adjusted under 35 U.S.C. 154(b) by 182 days.

(21) Appl. No.: 16/488,008

(22) PCT Filed: Feb. 20, 2018

(86) PCT No.: PCT/AU2018/050135
§ 371 (c)(1),
(2) Date: Aug. 22, 2019

(87) PCT Pub. No.: WO2018/152569
PCT Pub. Date: Aug. 30, 2018

(65) Prior Publication Data
US 2020/0033296 A1 Jan. 30, 2020

(30) Foreign Application Priority Data
Feb. 22, 2017 (AU) .............................. 2017900580

(51) Int. Cl.
*G01N 29/04* (2006.01)
*G01N 29/44* (2006.01)
*G01N 29/11* (2006.01)

(52) U.S. Cl.
CPC ............ *G01N 29/11* (2013.01); *G01N 29/043* (2013.01); *G01N 29/4445* (2013.01);
(Continued)

(58) Field of Classification Search
CPC ...... G01N 29/04; G01N 29/043; G01N 29/11; G01N 29/00; G01N 29/4445;
(Continued)

(56) References Cited

U.S. PATENT DOCUMENTS 4,143,553 A 3/1979 Martens et al.
6,854,332 B2 2/2005 Alleyne
(Continued)

FOREIGN PATENT DOCUMENTS

EP 2642284 A1 9/2013

OTHER PUBLICATIONS

Dissertation by Pinar Yilmazer "Structural Health Condition Monitoring of Rails Using Acoustic Emission Techniques", dated Sep. 2012; viewed on Internet on May 21, 2018.
(Continued)

*Primary Examiner* — Jacques M Saint Surin
(74) *Attorney, Agent, or Firm* — Innovation Capital Law Group, LLP; Vic Lin

(57) ABSTRACT

There is provided detection instrumentation for the detection of transverse rail defects in rail head hitherto considered untestable on account of acoustic signal attenuation problems of horizontal lamination defects. The detection instrumentation comprises a pulse-echo acoustic transducer having a wear face for contacting a fillet of the rail and being aimed towards a head of the rail such that the transmitter transmits acoustic signals into the head and the receiver receives acoustic signals reflected at differing depths within the head. A signal receiver operably coupled to the receiver times the acoustic signals according to a timeseries railhead depth position scale. Analysis of the depth positions of the reflected acoustic signals according to relative positioning of the instrumentation along the rail may identify the transverse rail defects.

23 Claims, 8 Drawing Sheets

(52) U.S. Cl.
CPC ............... *G01N 2291/015* (2013.01); *G01N 2291/0258* (2013.01); *G01N 2291/044* (2013.01); *G01N 2291/2623* (2013.01)

(58) Field of Classification Search
CPC ....... G01N 2291/015; G01N 2291/044; G01N 2291/2623; G01N 2291/0258
USPC .......................................................... 73/600
See application file for complete search history.

(56) References Cited

U.S. PATENT DOCUMENTS

| | | | | |
|---|---|---|---|---|
| 9,010,186 | B2* | 4/2015 | Pagano | G01N 29/043 |
| | | | | 73/636 |
| 10,766,510 | B1* | 9/2020 | Pagano | G01N 29/069 |
| 2009/0282923 | A1* | 11/2009 | Havira | G01N 29/2493 |
| | | | | 73/636 |
| 2013/0111997 | A1* | 5/2013 | Pagano | G01N 29/221 |
| | | | | 73/636 |
| 2016/0304104 | A1* | 10/2016 | Witte | B61L 15/0072 |
| 2017/0205379 | A1* | 7/2017 | Prince | G01N 29/265 |

OTHER PUBLICATIONS

International Search Report dated May 24, 2018 from corresponding PCT Application No. PCT/AU2018/050135.

* cited by examiner

METHODS AND INSTRUMENTATION FOR DETECTION OF TRANSVERSE ROLLING CONTACT FATIGUE RAIL DEFECTS WITHIN HEAD-HARDENED RAIL

FIELD OF THE INVENTION

This invention relates generally to rolling contact fatigue detection. More particularly, this invention relates to methods and instrumentation configured for identifying a specific type of defect within head-hardened rail, being a transverse rail defect, hitherto considered undetectable on account of acoustic signal attenuation of horizontal lamination defects which typically occur along with transverse rail defects.

The embodiments provided herein make reference primarily to 60 kg head-hardened rail which is increasingly being employed for high traffic demand rail sections. However, it should be appreciated that the embodiments provided herein may be applicable for other types of rail within the purposive scope of the embodiments described herein.

BACKGROUND OF THE INVENTION

FIGS. 1 and 2 show respective cross-sectional and perspective views of 60 kg head-hardened rail 100, comprising a head 101, a head-web transition fillet 102, a web 103 and a base 104.

It has recently been identified that this particular type of rail suffers from a surface "squat" defect 105 which cause horizontal lamination defects 106 thereunderneath within the metallic structure of the head 101.

According to the Engineering Manual TMC226 Rail Defect Handbook, squats are subsurface laminations which initiate at small surface cracks, thought to be at the rail surface. These cracks extend diagonally downwards, at an angle of about 20°-30° from the horizontal, until they reach approximately 4-6 mm below the surface, then spread laterally and longitudinally across and along the horizontal plane According to the Handbook, squat defects are of concern because there has been a considerable increase in their numbers over the past 4-6 years.

Further according to the Handbook there is a danger that the secondary or minor sub-surface cracks (illustrated in FIG. 50 of the Handbook) may turn down and grow on a transverse plane similarly to transverse defects, with the possibility of resulting in a broken rail if not detected in time.

Specifically, over time, and as is represented in FIG. 2, these horizontal defects 106 may form into transverse defects 107 in the direction of travel indicated sometimes exacerbated by repeated water hammer effect. These transverse defects 107 grow in size over time as is indicated in FIG. 1 such as over prolonged periods, sometimes in excess of 20 years. These transverse defects 107 compromise the structural integrity of the rail 100.

Problematically, reflections of horizontal lamination defects 106 prevent or hinder the detection of these transverse defects 107 using conventional acoustic penetration detection methods, a problem referred to in the industry as "loss of bottom" signals. Specifically, according to C5-4 of the Handbook, the horizontal subsurface primary cracks will cause shielding of the ultrasonic signals from deeper defects during normal ultrasonic inspections.

As such, 60 kg head-hardened rail is currently considered untestable for transverse defects.

Reliable detection instrumentation and methodology is urgently required to quickly and conveniently located in size these transverse defects 107 beneath horizontal laminations defects 106.

The present invention seeks to provide methods and instrumentation for detection of transverse rail defects within rail (especially 60 kg head-hardened rail) comprising acoustic signal attenuating horizontal lamination defects, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein detection instrumentation for the detection of transverse rail defects in rail head hitherto considered untestable on account of acoustic signal attenuation problems of horizontal lamination defects.

The present instrumentation is characterised in comprising a single pulse-echo acoustic transducer contacting a rail fillet and aimed to direct acoustic signals into the adjacent head from underneath and receive and display and/or analyse reflected signals received therefrom according to a timeseries railhead depth position scale.

The acoustic transducer is located to avoid signal attenuation caused by horizontal lamination defects.

The instrumentation may comprise an oscilloscope configured for timing reflected acoustic signals received by the transducer. The oscilloscope may be calibrated according to a timeseries railhead depth position scale such as, for example, from 0-10 such that signals reflected by the fillet surface correspond in position with depth marking 0 and signals reflected from an upper surface of the railhead correspond in position with depth marking 10.

As such, signal waveforms displayed by the oscilloscope are analysed to detect defects according to relative positioning of the instrumentation to identify the transverse rail defects.

Specifically, with such configuration of acoustic transducer, horizontal lamination defect indicative signals are identifiable from the reflected acoustic signals by occurring in from depth marking 10, such as at depth marking 9 for example.

These horizontal lamination defect indicative signals may be further identifiable from the reflected acoustic signals in remaining static in position on the timeseries railhead depth position scale irrespective of the relative positioning of the instrumentation along the rail.

Furthermore, with such a configuration of the acoustic transducer, transverse defect indicative signals are identifiable from the reflected acoustic signals by occurring even further in from depth marking 10.

These transverse defect indicative signals may be further identifiable from the reflected acoustic signals in transitioning across decreasing depth positions of the timeseries railhead depth position scale as the transducer passes along the railhead.

Furthermore, the termination point of the transverse defect indicative signals on the timeseries railhead depth position scale may be analysed to categorise the size of the transverse defect such as, for example, according to 0 to 20 mm, 21 to 60 mm and 61 to 90 mm transverse size defect categorisations.

No prior art acoustic detection apparatus is able to detect transverse rail defects within 60 kg head-hardened rail comprising acoustic signal attenuating horizontal lamination defects.

For example, U.S. Pat. No. 4,143,553 A (MARTENS et al.) 13 Mar. 1979 [hereinafter referred to as D1] discloses a search unit having acoustic transducers directed towards a base surface which slides along a rail web for the testing of unlaid rails specifically designed for the detection of "pipe" defects which form longitudinally on the web and are often entirely enclosed therein, particularly when rail is produced from an ingot.

D1 is configured for identifying web defects. Therefore, D1 does not comprise a single pulse-echo transducer contacting the rail fillet surface and aimed to direct and receive acoustic signals into and from the railhead. Whereas D1 does disclose acoustic receivers poised at differing angles, such angle is slight, such as at approximately 6° and furthermore to address the problem of objectionable signal loss caused by refraction between the array of receivers of D1.

Furthermore, D1 is not directed to and does not recognises the problems addressed by the present invention of detecting transverse rail defects in 60 kg head-hardened rail comprising signal attenuation horizontal lamination defects.

Rather, D1 seeks to solve problems of prior art smaller acoustic transducers which need to be "scrubbed" up and down the length of the web for adequate coverage and which further experience decreased ability to detect flaws as the angle between the transducer on the floorplan of the web increases with movement of the transducer towards the railhead or base.

As such, D1 proposes a search unit having a base surface spanning the width of the web and conforming in contouring thereto for reducing or ameliorating such problems such that internal web floors may be detected in a single unidirectional pass of the search unit.

U.S. Pat. No. 6,854,332 B2 (ALLEYNE) 15 Feb. 2005 [hereinafter referred to as D2] discloses an apparatus for inspection of non axi-symmetric elongated bodies mainly used in testing welds (castings) at the top of the head, web and toes of elongated rail. D2 is directed to the problem of being able to inspect all regions of the rail structure, especially the toe region of the rail which have clips which restrict conventional transducer access.

As such, D2 discloses a plurality of transmitters and a plurality of transducers (such as 14) arranged around the surface of the rail.

Furthermore, D2 discloses weighting each drive signals of each transducer with respect to the other transducers of the array such that the overall pattern of excitation corresponds to the desired mode shape. As such, the transducer array of D2 can be used to excite several modes in turn to specifically target defects occurring in particular parts of the rail preferentially displaced by a given mode, such as within the railhead as is shown in FIG. 3 of D2, the toe of the rail is shown in FIG. 4 of D2 or the web as is shown in FIG. 5 of D2.

However, D2 does not disclose a single transducer of the present invention contacting the rail fillet and configured for transmitting and receiving acoustic signals to and from the railhead for the detection of transverse defects.

Rather, D2 teaches an array of transducers for exciting different modes.

Furthermore, D2 does not teach or suggest timeseries analysis of depth positions of the reflected acoustic signals according to relative positioning of the instrumentation as the transducers of D2 are fixed in place, such as by being clamped to the rail.

Furthermore, D2 specifically teaches away from the use of a single transducer by showing problems of spurious signals caused by the use of a single transducer in FIG. 8 of D2.

Furthermore, D2 is not directed to and does not recognise the problems addressed by the present invention of detecting transverse rail defects in 60 kg head-hardened rail comprising signal attenuation horizontal lamination defects, but rather problems in being able to inspect all regions of a non-axisymmetric structure.

Furthermore, the multiple transducers taught by D2 would not be effective in detecting transverse defects according to the present application in that the signals of the multiple transducers of D2 would be attenuated by horizontal lamination defects.

EP 2642284 A1 (Korea Railroad Research Institute) 25 Sep. 2013 [hereinafter referred to as D3] discloses an automatic detection apparatus for inspecting rail welds having a particular mechanical configuration for parking when not in use for not inferring with rail traffic.

Apart from having a differing configuration as compared to the present invention, D3 is not directed to and does not recognise the problems addressed by the present invention of detecting transverse rail defects in 60 kg head-hardened rail comprising signal attenuation horizontal lamination defects, but rather problems in being able to inspect all regions of a non-axisymmetric structure.

As such, with the foregoing in mind, in accordance with one aspect, there is provided a method of detection of transverse rail defects within head-hardened rail (such as 60 kg head-hardened rail) comprising acoustic signal attenuating horizontal lamination defects, the method comprising: moving detection instrumentation along the rail, the detection instrumentation comprising: a pulse-echo acoustic transducer: having a wear face for contacting a fillet of the rail; and having an acoustic transmitter and an acoustic receiver, wherein the transducer is aimed towards a head of the rail such that the transmitter transmits acoustic signals into the head and the receiver receives acoustic signals reflected at differing depths within the head; a signal receiver operably coupled to the receiver configured for timing the acoustic signals according to a timeseries railhead depth position scale; and timeseries analysis of the depth positions of the reflected acoustic signals according to relative positioning of the instrumentation along the rail to identify the transverse rail defects.

The signal receiver may be calibrated to time the reflected signals according to a minimum depth position and a maximum depth position with respect to the receiver on the railhead depth position scale.

The minimum depth position may correspond to signals reflected from a surface of the fillet.

The maximum depth position may correspond to signals reflected from an upper surface of the head.

Moving detection instrumentations along the rail may comprise moving the detection instrumentation in a direction of rail travel.

The timeseries analysis may comprise identification of a transverse defect indicative signal from the reflected acoustic signals by identifying the transverse defect indicative signal transitioning across decreasing depth positions of the timeseries railhead depth position scale.

The method may further comprise identification of the transverse defect indicative signals from the reflected acoustic signals by identifying the transverse defect indicative signal transitioning proportionately to respective positions of the instrumentation.

Timeseries analysis may comprise identification of a transverse defect indicative signal from the reflected acoustic signal by identifying increasing aptitude of the transverse defect indicative signal.

Therein the method may further comprise transverse defect sizing classification comprising identification of a depth position band along the timeseries railhead depth position scale within which the transverse defect indicative signal terminates.

The depth position band may be one of three depth position bands arranged along the timeseries railhead depth position scale according to transverse defect sizing classifications comprising less than approximately 20 mm, between approximately 20 mm and 60 mm and greater than approximately 60 mm.

Therein the method may further comprise transverse defect sizing classification comprising comparing and amplitude of the transverse defect indicative signal with respect to at least one amplitude threshold.

The timeseries analysis may further comprise analysis of the depth positions of the reflected acoustic signals to identify horizontal lamination defects.

The timeseries analysis may further comprise identification of a horizontal lamination defect indicative signal from the reflected acoustic signals by identifying the horizontal lamination defect indicative signal remaining substantially static at a depth position of the timeseries railhead depth position scale irrespective of the position of the instrumentations.

The timeseries analysis may further comprise identification of a horizontal lamination defect indicative signal from the reflected acoustic signals by identifying the horizontal lamination defect indicative signal occurring at a depth position less than a maximum depth position.

Therein the method may further comprise a display configured for displaying a timeseries representation of the reflected acoustic signals according this to the timeseries railhead depth position scale.

Therein the method may further comprise a computational analysis unit configured operably coupled to the receiver for automated identification of the transverse rail defects according to the reflected acoustic signals received therefrom.

The analysis unit may be further operably coupled to an instrumentation position sensor for receiving position indicative signals therefrom and wherein the analysis unit may be further configured for identification of the transverse rail defects further in accordance with the position indicative signals.

The analysis unit may be further configured for identification of a transverse defect indicative signal characterised in transitioning across the timeseries railhead depth position scale proportionate to instrumentation position.

The analysis unit may be configured for storing data indicative of the location of the transverse defect along the rail.

The analysis unit may be further configured for analysing a termination point of the transverse defect indicative signal along the railhead depth position scale to classify the transverse defect according to a sizing classification.

The analysis unit may be further configured for storing data indicative of the sizing classification of the transverse defect.

The wear face may be convex.

Therein the method may further comprise a coupling agent reservoir configured for introducing coupling agent in advance of the wear face.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
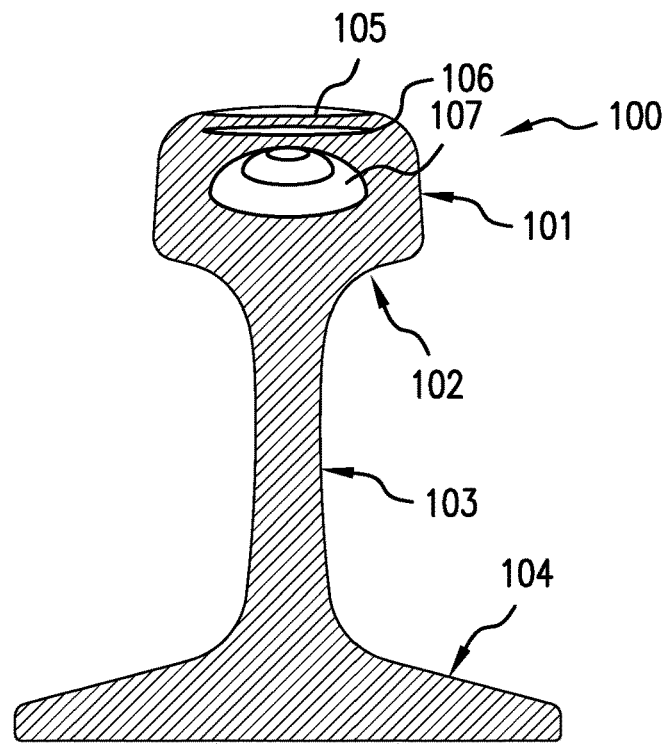
FIG. 1 and two show rail sections exhibiting horizontal lamination defects from which transverse defects typically emanate over time.
Figure 2:
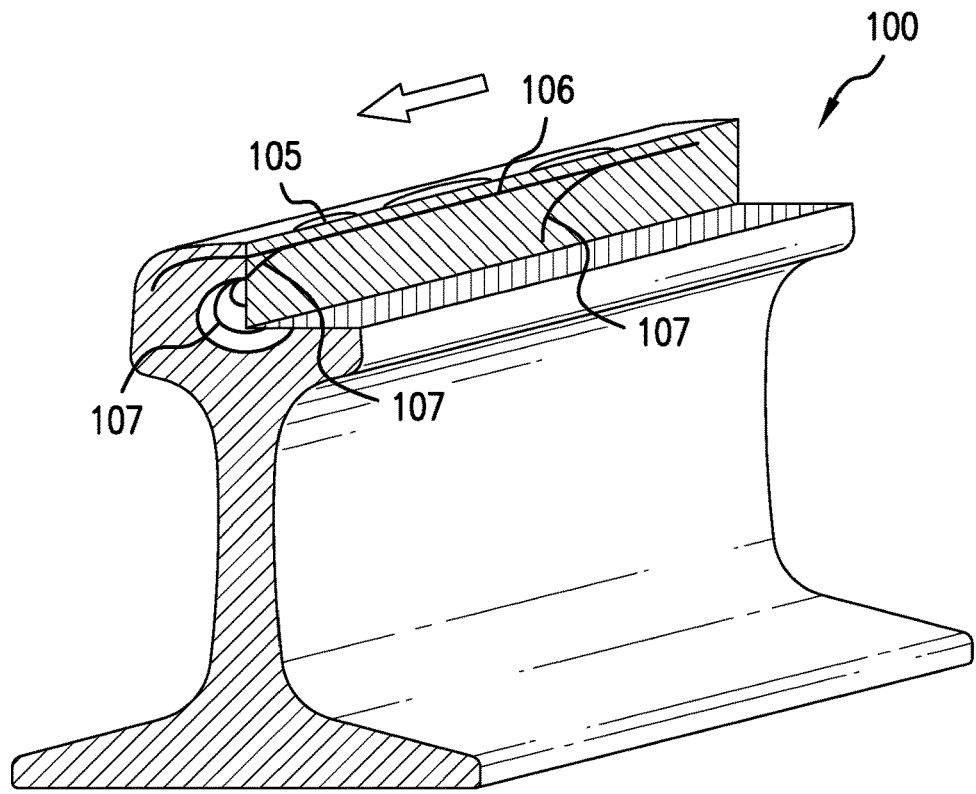
Figure 3:
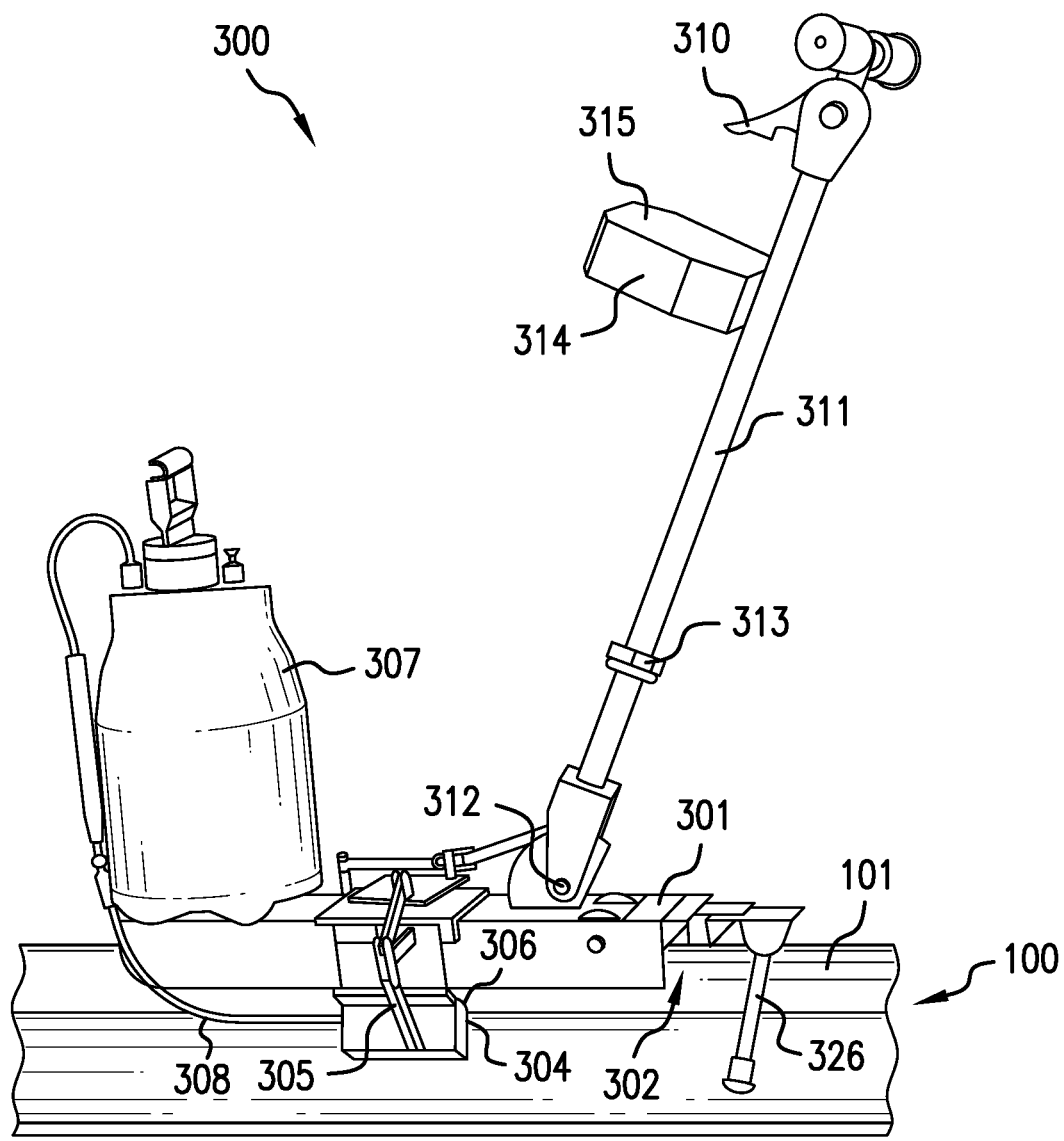
FIG. 3 illustrates detection instrumentation in accordance with an embodiment.
Figure 4:
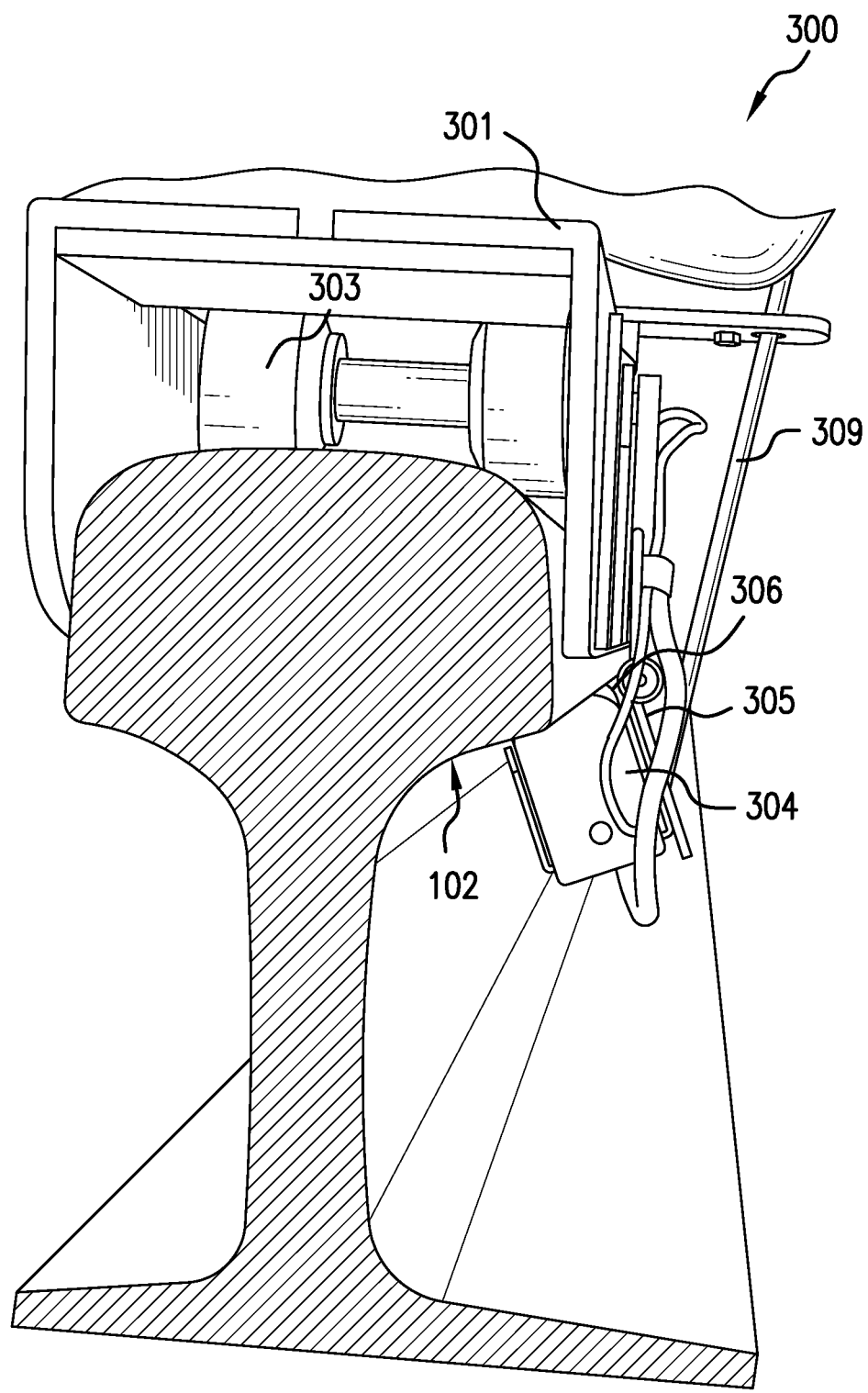
FIG. 4 illustrates the manner of engagement of the rail by the detection instrumentation in accordance with an embodiment.

FIGS. 3 and 4 shows detection instrumentation 300 for detection of transverse rail defects 107 in accordance with an embodiment.

The instrumentation 300 comprises a bogey 301 defining a channel 302 thereunderneath that travels across the head 101 of the rail 100 on bearings 303.

The bogey 301 supports a single pulse-echo acoustic (such as piezoelectric) transducer 300 which may be mounted on a swing arm 305 from one side of the bogey 301. The transducer 304 is directed at the fillet 102 of the rail 103 at approximately 45° so as to be able to direct and receive acoustic signals into and from the railhead 101. The transducer 304 may comprise a convex wear face 306 so as to conform with the concave profile of the fillet 102 for enhancing signal propagation. A reservoir 307 may feed coupling agent via a hose in advance of the wear face 306 for further enhancing acoustic signal propagation.

The bogey 301 may be pushed along the rail utilising a handle 311 which may be pivotally attached to the bogey 301 at pivot point 312. Furthermore, the handle 311 may be length adjustable at telescopic interface 313.

A kickstand 326 may support the instrumentations 300 upright when not in use.

A lever 310 mounted to the handle may pull a rod 309 to swing the transducer 304 away from the fillet 102 on the swing arm 305 to avoid fouling obstructions for engaging or disengaging the bogey 301.

The instrumentation 300 comprises an oscilloscope operably coupled to the transducer 304 having a screen 305 directed towards the user for the viewing of timeseries reflected acoustic signals received by the transducer 304.

Figure 5:
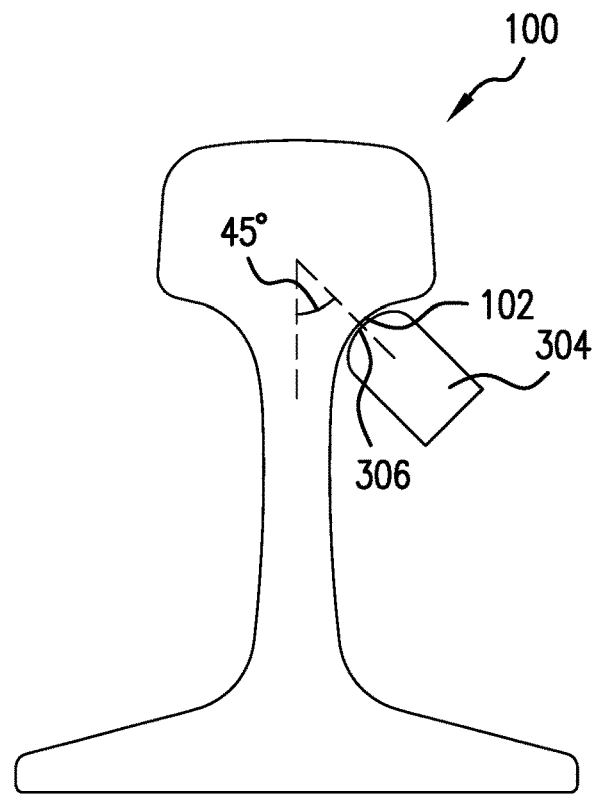
FIG. 5 illustrates the manner of engagement of the transducer of the instrumentation to the fillet of the rail.

FIG. 5 shows the manner of engagement of the rail 100 by the transducer 304. As can be seen, the transducer 304 contacts and slides across the fillet 102. Furthermore, the transducer 304 is angled (such as at approximately 45°) to transmit and receive acoustic signals into and from the railhead 101. As is also shown, the convex curvature of the wear face 306 conforms substantially to the corresponding concave cross-section of the fillet 102 for enhancing acoustic signal propagation.

Figure 6:
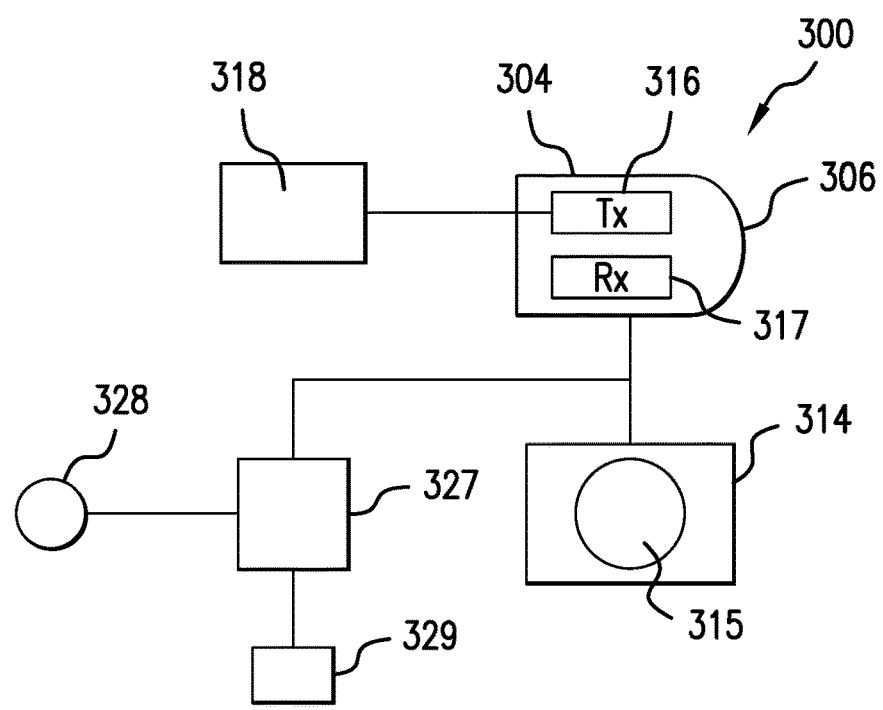
FIG. 6 shows an exemplary schematic diagram of the instrumentation in accordance with an embodiment.

FIG. 6 shows a schematic representation of the instrumentation 300 in accordance with an embodiment. The representation shows the transducer 304 comprising an acoustic transmitter 306 and an acoustic receiver 317 directed towards the wear face 306.

The signal generator 318 may drive the transmitter 316 at a frequency of approximately 2.25 MHz in one embodiment.

The oscilloscope 304 is operably coupled to the receiver 317 so as to display timeseries reflected acoustic signals on the screen 315 thereof.

In embodiments, the instrumentation 300 may comprise a computational analysis unit 327 for the automated analysis of signals received from the receiver 317.

In embodiments, the analysis unit 327 may receive positional signals from a rotation transducer 328 operably coupled to the bearings 303 so as to be able to analyse timeseries signals received from the receiver 317 with respect to the position of the bogey 301 which, as will be described in further detail below may be useful for differentiating between horizontal lamination and a transverse defect indicative signals.

Furthermore, the analysis unit 327 may be configured for automating the classification of transverse defects and recording such information.

In embodiments, the analysis unit 327 may record positions of detect defects according to positions measured by the rotation transducer 328 and/or GPS receiver 329.

Figure 7:
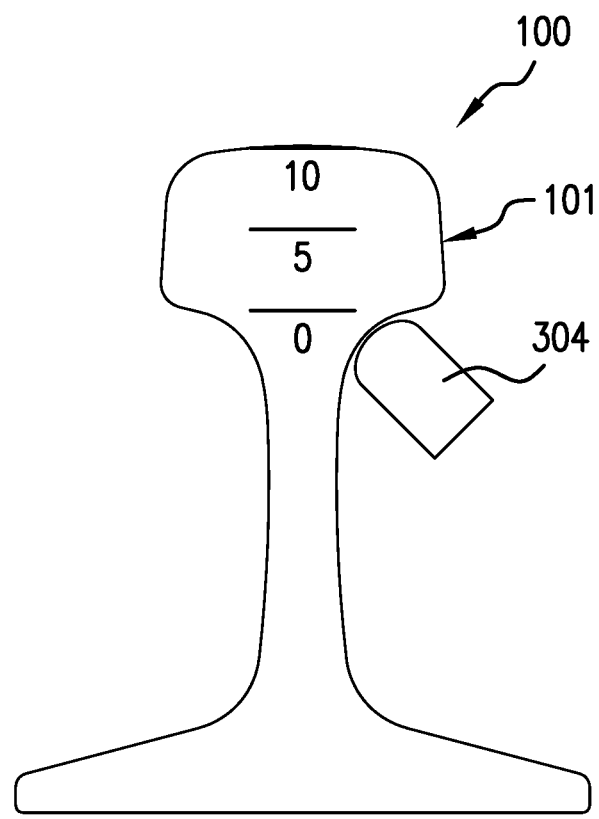
FIG. 7 and eight illustrate the calibration of a time series railhead exposition scale in accordance with an embodiment.
Figure 8:
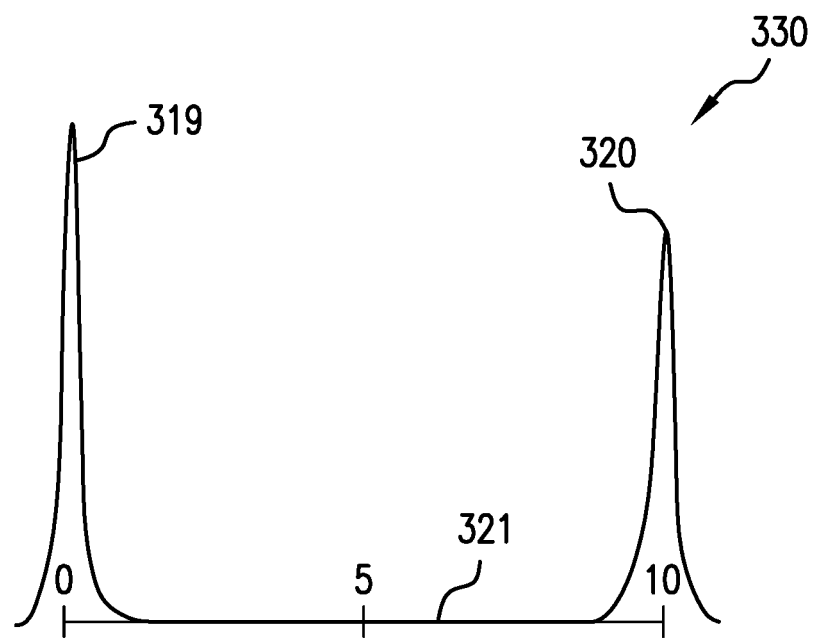

FIGS. 7 and 8 illustrate the calibration of a timeseries representation 330 displayed by the display 325 of the oscilloscope 314 of the instrumentations 300. Specifically, the transducer 304 is operably coupled to the fillet 102 in the manner described above.

The oscilloscope 314 is thereafter calibrated to calibrate a timeseries railhead depth position scale 321 according to depth positions of the railhead 101 given in FIG. 7 as being on a scale from 0 to 10 from bottom to top of the railhead 101.

As can be seen, the timeseries representation 330 shows a fillet surface indicative signal 319 indicating the acoustic signal reflected by the surface of the fillet 102 and a railhead upper surface indicative signal 320 representing signal reflected from the upper surface of the railhead 101 on the timeseries railhead depth position scale 321.

The oscilloscope 314 is adjusted such that the signals 319, 320 correspond to the depth position markings of the timeseries railhead depth position scale 321.

Figure 9:
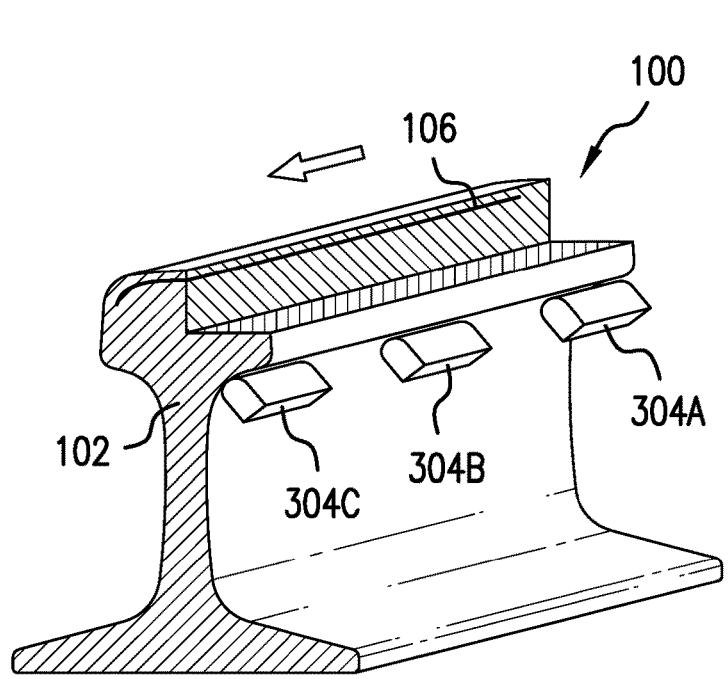
FIGS. 9-11 illustrate a method of identifying horizontal lamination defect indicative signals from reflected acoustic signals using a timeseries representation on the railhead depth positions scale in accordance with an embodiment.
Figure 10:
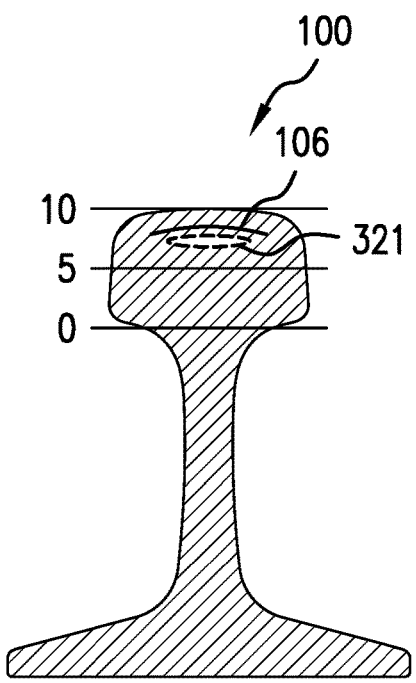
Figure 11:
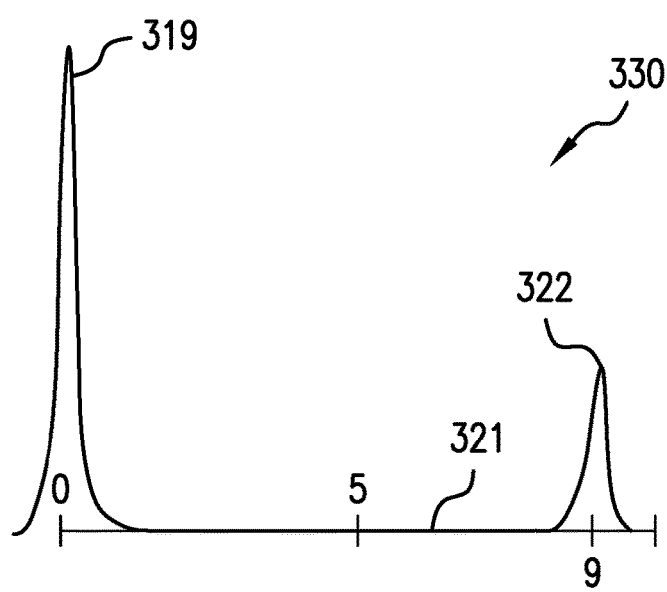

FIGS. 9-11 illustrate the timeseries signals received and displayed by the timeseries representation 330 in the presence of a horizontal lamination defect 106. Specifically, FIG. 9 shows a cross-sectional view of the rail 100 having a horizontal lamination defect 106 in the railhead 101. Furthermore, FIG. 9 shows the travelling of the transducer 304 along the rail 100 in the direction of rail travel from positions A to C.

FIG. 10 shows a cross-sectional view of the rail having the horizontal lamination defect 106 therein.

As such, acoustic signal is transmitted by the transmitter 316 and is reflected by the horizontal lamination defect 106 at reflection point 321 which is correspondingly received by the receiver 317.

As such, FIG. 11 illustrates the characterising signals displayed by the timeseries representation 330 wherein, as can be seen, the representation 330 comprises a horizontal lamination defect indicative signal 322. Specifically, there is shown the fillet surface indicative signal 319 but the previous railhead surface indicative signal 320 is absent or attenuated on account of the horizontal lamination defect 106.

The horizontal lamination defect indicative signal 322 is characterised in being located in from depth marking 10 (in other words, at a depth beneath the surface of the railhead), such as at approximately depth marking 8-9 on the timeseries railhead depth position scale 321.

Furthermore, in certain situations, the horizontal lamination defect indicative signal 322 may have lesser amplitude than that of the fillet surface indicative signal 319 or the railhead surface indicative signal 320 on account of the poor reflection properties on account of the nonuniformity of the horizontal lamination defect 306.

Furthermore, the horizontal lamination defect indicative signal 322 may be further characterised in remaining static as the transducer 304 moves from positions A-C. As can be seen from FIG. 9, the horizontal lamination defect 106 locates longitudinally and horizontally within the railhead 100 and, as such, remains substantially equidistant from the respective positions of the transducer 304 at positions A-C. As such, the horizontal lamination characterising signal 322 generally remains in the same depth position marking on the timeseries railhead depth position scale 321 as the bogie 301 travels along the rail 100.

Figure 12:
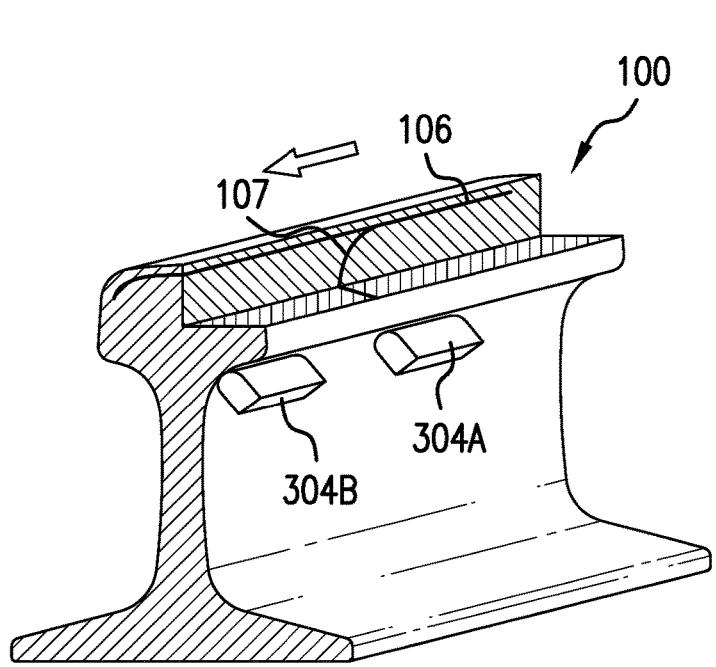
FIGS. 12-14 illustrate a method of identifying transverse defect indicative signals from reflected acoustic signals using a timeseries representation on the railhead exposition scale in accordance with an embodiment.
Figure 13:
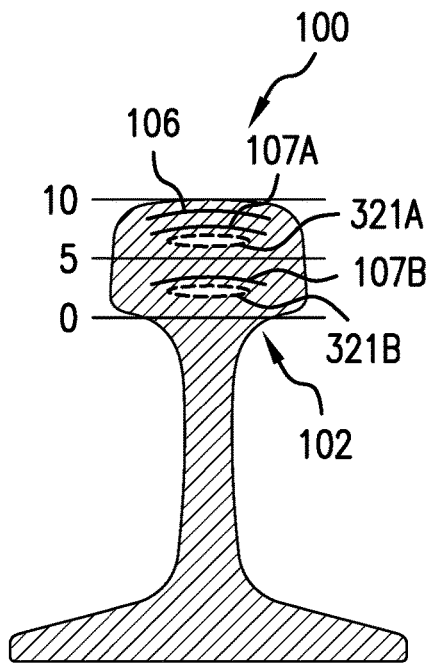
Figure 14:
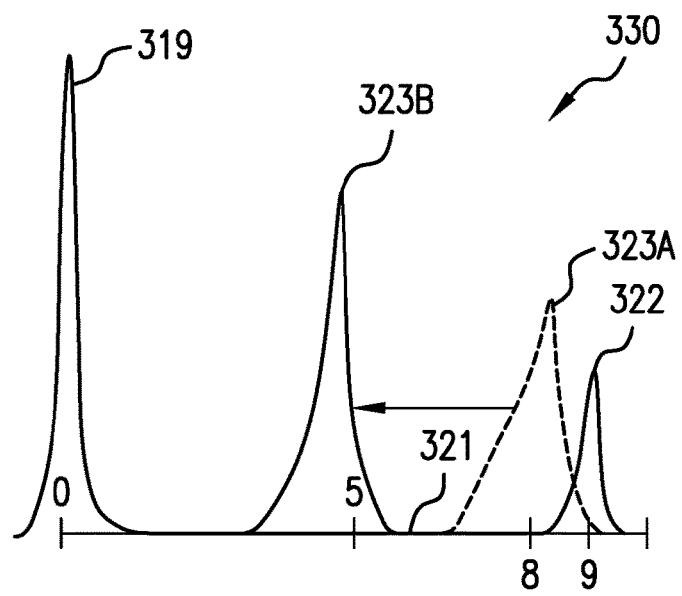

FIG. 12-14 illustrate the characterising signals received and displayed by the timeseries representation 330 in the presence of transverse defects 107.

Specifically, FIG. 12 shows a cross-sectional perspective view of the rail 100 having a longitudinal horizontal lamination defect 106. However, at a point, the horizontal lamination defect 106 transitions more vertically to a transverse defect 107. Furthermore, there is shown the transducer 304 travelling across the position of the transverse defect 107 from positions A-B.

FIG. 14 illustrates exemplary waveforms displayed by the timeseries representation 330.

Prior reaching the position of the transverse defect 107, timeseries representation 330 may display the horizontal lamination defect indicative signal 322 which, as described above, may be located at approximately depth position 9 and remain approximately at that position as the transducer 304 travels along the rail 100.

However, when reaching the position of the transverse defect 107, acoustic signals reflected therefrom is detected by the receiver 317.

As can be seen from FIG. 12, the transverse defects 307 are generally characterised in starting horizontally from the horizontal lamination defect 106 and transitioning more vertically/transversely in the direction of rail travel indicated.

As such, FIG. 14 illustrates the transverse defect indicative signal 323A received at position A.

As can be seen, the initial transverse defect indicative signal 323A is located in (i.e. to the left or at a lower depth position) of the horizontal defect indicative signal 322 such as at depth position 8 for example. Furthermore, on account of being closer to the receiver 317, the initial transverse defect indicative signal 323A may have greater amplitude as compared to the horizontal defect indicative signal 322.

FIG. 13 shows the cross-sectional view of the rail 100 having the transverse defect 107A corresponding to position A shown just beneath the horizontal lamination defect 106. As such, acoustic signals are reflected at from reflection point 321A resulting in the initial transverse defect indicative signal 323A shown in FIG. 14.

Thereafter, as the transducer 304 travels across the transverse defect 107 to position B, the transverse defect 107 may approach closer to the fillet 102 as is illustrated in FIG. 13.

As such, as can be seen from FIG. 14, the transverse defect indicative signal 323 moves across the timeseries scale (i.e. from right to left across the scale 321) from approximately depth position 8 down to depth positions 7, 6, 5, 4, and on as the as the transducer 304 moves from position A. In other words, the transverse defect indicative signal 323 transitions across decreasing depth positions of the timeseries railhead depth position scale.

As such, the transverse defect indicative signal 323 is characterised in travelling from right to left across the timeseries railhead depth position scale 321 as compared to the horizontal defect indicative signal 322 which generally remains timeseries static on the scale 321.

Furthermore, the transverse defect indicative signal 323 may be further characterised in increasing amplitude as the transverse defect 107 approaches closer to the transducer.

Figure 15:
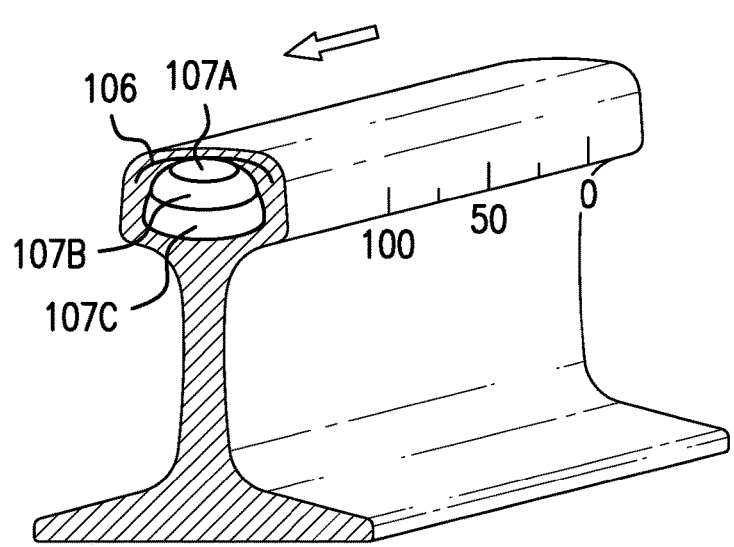
FIGS. 15-17 illustrate a method of sizing classification of identified transverse defects in accordance with an embodiment.
Figure 16:
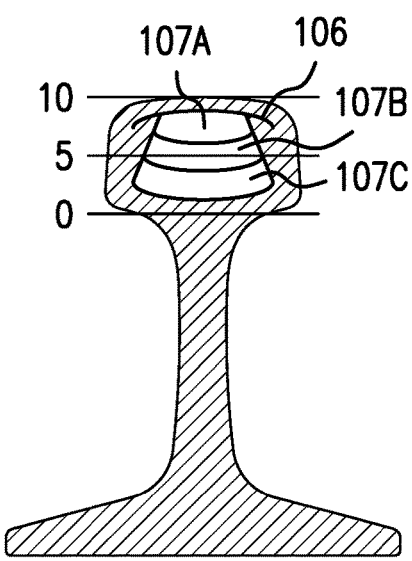
Figure 17:
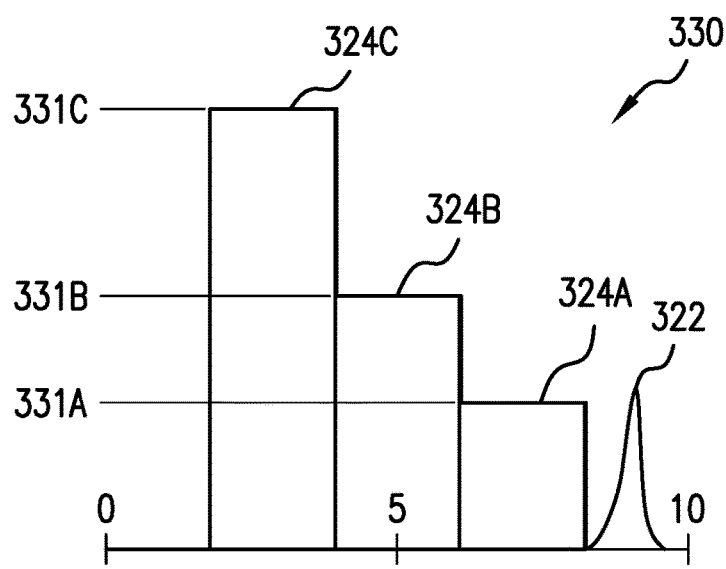

FIGS. 15-17 illustrate transverse defect 107 size characterisation in accordance with the signal received and displayed by the instrumentations 300.

Specifically, FIGS. 15 and 16 illustrate the railhead 101 comprising the horizontal lamination defect 106 and transverse defects 107 of three differing sizes A-C. In this regard, size A may represent a diameter of up to 20 mm, size B may represent a diameter from 21 mm-60 mm and size C the represented diameter from 61 mm to 90 mm.

FIG. 17 illustrates the characterising signals displayed via the timeseries representation 330 of the oscilloscope 314.

As can be seen, the signals may comprise the horizontal lamination defect indicative reflected signal 322. However, the transverse defect indicative reflective signals 323 are categorised into three bands 324 A-B corresponding to the above size categorisations A-C.

As such, the screen 315 may be analysed to determine at which band the transverse defect indicative signal 323 terminates along the scale 321.

For example, a transverse defect indicative signal 323 appearing on the timeseries representation 330, travelling from right to left and terminating within band 324 A may indicate a transverse defect 107 of between 0 and 20 mm in diameter. Alternatively, should the transverse defect indicative signal 323 received terminate within band 324 B, such would indicate a transverse defect 107 of between 20 and 60 mm in diameter.

In embodiments, alternatively, or additionally to analysing the band 324 within which the signal 323 terminates, the amplitude of the signal 323 may be analysed according to various amplitude threshold 331.

As alluded to above, in one embodiment, the oscilloscope 314 comprises a screen 315 which is inspected by the operator in use, making deductions therefrom from the timeseries waveforms displayed in the manner described herein.

However, in embodiments, the instrumentations 300 may comprise the analysis unit 327 which may automate or augment such analysis. The analysis unit 327 may comprise a processor for processing digital data. The analysis unit 327 may further comprise a memory device configured for storing digital data including computer program code instructions. The memory device may be operably coupled to the processor such that, in use, the processor may receive computer program code instructions therefrom for implementing the functionality described herein for execution.

In one embodiment, the bearing 303 of the instrumentation 300 may be driven such that the instrumentation 300 is self-propelled along the rail 100.

While travelling, the analysis unit 327 may monitor the movement of the bogie 301 along the rail 100 utilising the bearing rotation transducer 328.

Additionally, the analysis unit 327 may analyse the signals received from the receiver 317.

For example, when detecting a signal located approximately just in from the maximum depth marking 10 and which remains generally in place as the bogie 301 moves, the analysis unit 327 may detect the presence of a horizontal lamination defect 106 and record data indicative of the position and length thereof.

Furthermore, when detecting a signal that travels across the timeseries railhead depth position scale 321 in a direction of decreasing depth (i.e. from right to left), the analysis unit 327 may record the presence of a transverse defect 107.

Furthermore, the analysis unit 327 may analyse the sizing band 324 within which the signal 323 terminates and/or analyse the amplitude of the signal 323 with reference to the amplitude thresholds 331 so as to categorise the sizing of the transverse defect 107 and record such accordingly in conjunction with a positional reference.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of detection of transverse rail defects within head-hardened rail comprising acoustic signal attenuating horizontal lamination defects, the method comprising:
   moving detection instrumentation along the rail, the detection instrumentation comprising:
   a pulse-echo acoustic transducer:
   having a wear face for contacting a fillet of the rail;

having an acoustic transmitter and an acoustic receiver, wherein the transducer is aimed towards a head of the rail such that the transmitter transmits acoustic signals into the head and the receiver receives acoustic signals reflected at differing depths within the head; and a signal receiver operably coupled to the receiver configured for timing the acoustic signals according to a timeseries railhead depth position scale; and timeseries analysis of the depth positions of the reflected acoustic signals according to relative positioning of the instrumentation along the rail to identify the transverse rail defects.

2. A method as claimed in claim 1, wherein the signal receiver is calibrated to time the reflected signals according to a minimum depth position and a maximum depth position with respect to the receiver on the railhead depth position scale.

3. A method as claimed in claim 2, wherein the minimum depth position corresponds to signals reflected from a surface of the fillet.

4. A method as claimed in claim 2, wherein the maximum depth position corresponds to signals reflected from an upper surface of the head.

5. A method as claimed in claim 1, wherein moving detection instrumentations along the rail comprises moving the detection instrumentation in a direction of rail travel.

6. A method as claimed in claim 1, wherein the timeseries analysis comprises identification of a transverse defect indicative signal from the reflected acoustic signals by identifying the transverse defect indicative signal transitioning across decreasing depth positions of the timeseries railhead depth position scale.

7. A method as claimed in claim 6, further comprising identification of the transverse defect indicative signals from the reflected acoustic signals by identifying the transverse defect indicative signal transitioning proportionately to respective positions of the instrumentation.

8. A method as claimed in claim 1, wherein timeseries analysis comprises identification of a transverse defect indicative signal from the reflected acoustic signal by identifying increasing aptitude of the transverse defect indicative signal.

9. A method as claimed in claim 6, further comprising transverse defect sizing classification comprising identification of a depth position band along the timeseries railhead depth position scale within which the transverse defect indicative signal terminates.

10. A method as claimed in claim 9, wherein the depth position band is one of three depth position bands arranged along the timeseries railhead depth position scale according to transverse defect sizing classifications comprising less than approximately 20 mm, between approximately 20 mm and 60 mm and greater than approximately 60 mm.

11. A method as claimed in claim 6, further comprising transverse defect sizing classification comprising comparing and amplitude of the transverse defect indicative signal with respect to at least one amplitude threshold.

12. A method as claimed in claim 1, wherein the timeseries analysis further comprises analysis of the depth positions of the reflected acoustic signals to identify horizontal lamination defects.

13. A method as claimed in claim 12, wherein the timeseries analysis further comprises identification of a horizontal lamination defect indicative signal from the reflected acoustic signals by identifying the horizontal lamination defect indicative signal remaining substantially static at a depth position of the timeseries railhead depth position scale irrespective of the position of the instrumentations.

14. A method as claimed in claim 12, wherein the timeseries analysis further comprises identification of a horizontal lamination defect indicative signal from the reflected acoustic signals by identifying the horizontal lamination defect indicative signal occurring at a depth position less than a maximum depth position.

15. A method as claimed in claim 1, further comprising a display configured for displaying a timeseries representation of the reflected acoustic signals according this to the timeseries railhead depth position scale.

16. A method as claimed in claim 1, further comprising a computational analysis unit configured operably coupled to the receiver for automated identification of the transverse rail defects according to the reflected acoustic signals received therefrom.

17. A method as claimed in claim 16, wherein the analysis unit is further operably coupled to an instrumentation position sensor for receiving position indicative signals therefrom and wherein the analysis unit is further configured for identification of the transverse rail defects further in accordance with the position indicative signals.

18. A method as claimed in claim 17, wherein the analysis unit is further configured for identification of a transverse defect indicative signal characterised in transitioning across the timeseries railhead depth position scale proportionate to instrumentation position.

19. A method as claimed in claim 18, wherein the analysis unit is configured for storing data indicative of the location of the transverse defect along the rail.

20. A method as claimed in claim 17, wherein the analysis unit is further configured for analysing a termination point of the transverse defect indicative signal along the railhead depth position scale to classify the transverse defect according to a sizing classification.

21. A method as claimed in claim 20, wherein the analysis unit is further configured for storing data indicative of the sizing classification of the transverse defect.

22. A method as claimed in claim 1, wherein the wear face is convex.

23. A method as claimed in claim 1, further comprising a coupling agent reservoir configured for introducing coupling agent in advance of the wear face.

* * * * *